United States Patent
Phoenix et al.

(10) Patent No.: US 10,581,799 B2
(45) Date of Patent: Mar. 3, 2020

(54) METHOD FOR A LOSING REGISTRAR TO TRANSFER A DOMAIN NAME FROM THE LOSING REGISTRAR TO A GAINING REGISTRAR

(71) Applicant: Go Daddy Operating Company, LLC, Scottsdale, AZ (US)

(72) Inventors: Sarah Phoenix, Long Valley, NJ (US); Arun Krishnasamy, Waltham, MA (US); Raja Ravi Teja Panidepu, Kirkland, WA (US); Brian Kirsten, Winter Park, FL (US); Kevin Allendorf, Swisher, IA (US); Karen Munoz, Scottsdale, AZ (US); Chitra Yarlagadda, Tempe, AZ (US); Tanmay Patil, Tempe, AZ (US)

(73) Assignee: Go Daddy Operating Company, LLC, Scottsdale, AZ (US)

(*) Notice: Subject to any disclaimer, the term of this patent is extended or adjusted under 35 U.S.C. 154(b) by 80 days.

(21) Appl. No.: 16/001,659

(22) Filed: Jun. 6, 2018

(65) Prior Publication Data
US 2019/0379636 A1 Dec. 12, 2019

(51) Int. Cl.
*H04L 29/12* (2006.01)
(52) U.S. Cl.
CPC ...... *H04L 61/3025* (2013.01); *H04L 61/1511* (2013.01); *H04L 61/301* (2013.01)
(58) Field of Classification Search
CPC . H04L 61/3025; H04L 61/1511; H04L 61/301
See application file for complete search history.

(56) References Cited

U.S. PATENT DOCUMENTS

| 2004/0199493 | A1* | 10/2004 | Ruiz | G06Q 30/06 |
| 2010/0106616 | A1* | 4/2010 | Adelman | G06Q 10/06 705/26.1 |
| 2012/0173681 | A1* | 7/2012 | Gould | H04L 61/1511 709/221 |
| 2018/0351910 | A1* | 12/2018 | Zhou | H04L 61/302 |

OTHER PUBLICATIONS

S. Hollenbeck, Extensible Provisioning Protocol (EPP) Domain Name Mappin, Aug. 2009, RFC 5731, Internet Engineering Task Force, Network Working Group (Year: 2009).*

* cited by examiner

*Primary Examiner* — Wing F Chan
*Assistant Examiner* — Billy H Ng
(74) *Attorney, Agent, or Firm* — Greenberg Traurig, LLP

(57) ABSTRACT

A registrant, after registering a domain name at a losing registrar, may request at a gaining registrar that the domain name be transferred to the gaining registrar. The gaining registrar may verify that the domain name is registered to the registrant, available for transfer and the person requesting the transfer is in fact the registrant. The gaining registrar may provide evidence that the registrant was authenticated to the losing registrar and request a registry to transfer the domain name to the gaining registrar. Upon the registry confirming the validity of the request with the losing registrar, the registry may transfer the domain name to the gaining registrar. This method allows the registrant to transfer the domain name, after registering the domain name at the losing registrar, to the gaining registrar entirely from the gaining registrar. In other words, the registrant does not need to communicate with the losing registrar during the transfer process of the domain name to the gaining registrar.

19 Claims, 8 Drawing Sheets

METHOD FOR A LOSING REGISTRAR TO TRANSFER A DOMAIN NAME FROM THE LOSING REGISTRAR TO A GAINING REGISTRAR

FIELD OF THE INVENTION

The present invention generally relates to a method for a registrant to transfer a domain name registered at a losing registrar to a gaining registrar, wherein the transfer may be initiated by the registrant at the gaining registrar and without requiring the registrant to communicate directly with the losing registrar after the domain name is registered.

SUMMARY OF THE INVENTION

The present invention provides methods for a registrant of a domain name, after registering the domain name with a losing registrar, to transfer the domain name from a losing registrar to a gaining registrar from the gaining registrar and without the registrant communicating directly with the losing registrar.

In an embodiment of the invention, presented from the point of view of a gaining registrar, the gaining registrar may receive login credentials from a registrant and upon authenticating the login credentials from the registrant, the gaining registrar may log the registrant into a registrant account of the gaining registrar.

The gaining registrar may determine one or more domain names registered to the registrant at a losing registrar. For purposes of this invention, it should be understood that the gaining registrar is a different registrar than the losing registrar.

The gaining registrar may verify that the domain name is registered to the registrant at the losing registrar and that the domain name is available for transfer from the losing registrar to the gaining registrar. Any locks or holds or problems detected in allowing the domain name to be transferred from the losing registrar to the gaining registrar may be communicated to the registrant and resolved if necessary.

The gaining registrar may retrieve contact information, such as a telephone number and an email address for the registrant from the losing registrar or the WHOIS database. The contact information is preferably chosen as being reliable in authenticating the registrant and difficult to fraudulently deceive.

The gaining registrar may display on a client device of the registrant the domain name that is registered to the registrant at the losing registrar. In preferred embodiments the gaining registrar has also confirmed with the losing registrar that the domain name is available for transfer from the losing registrar to the gaining registrar.

The gaining registrar may receive from the client device of the registrant a request to transfer the domain name from the losing registrar to the registrant account of the gaining registrar. The gaining registrar may display a message on the client device that the transfer is in progress.

The gaining registrar may transmit a transfer hold to the losing registrar for the domain name. The gaining registrar may receive a confirmation from the losing registrar that the transfer hold for the domain name is active.

The gaining registrar may use the registrant contact information to authenticate or confirm the identity of the registrant. As non-limiting examples, the registrant may transmit an email with a first identification method to the registrant and an SMS message with a second identification method to the registrant.

The gaining registrar may receive from the registrant one or more responses from one or more identification methods. The gaining registrar may be configured to terminate the transfer of the domain name if any of the responses from the registrant are not authenticated. The gaining registrar may also be configured to proceed with the transfer of the domain name only if a desired predetermined minimum number of responses from the registrant are authenticated.

The gaining registrar may store the responses received from the registrant in a database as evidence that the registrant authorized the transfer. The gaining registrar may transmit a transfer request of the domain name to the registry. The registry may be configured, upon receiving the transfer request from the gaining registrar, to request an acknowledgement from the losing registrar.

The gaining registrar may receive a confirmation of the transfer of the domain name from the registry. The gaining registrar may transmit a message to the client device of the registrant that the transfer for the domain name from the losing registrar to the gaining registrar is complete.

In another embodiment of the invention, presented from the point of view of a losing registrar, the losing registrar may transfer a domain name registered to a registrant to a gaining registrar without the registrant, after registering the domain name with the losing registrar, directly communicating with the losing registrant.

The losing registrar may register the domain name to the registrant. As part of the domain name registration process, the losing registrar may collect contact information from the registrant. As non-limiting examples, the losing registrar may collect and store in a database names, addresses, telephone numbers and/or email address of the people authorized by the registrant to make decisions for the domain name.

The losing registrar may provide various services, as desired by the registrant and as offered by the losing registrar, to the registrant to manage and control the registered domain name.

At some point after the registrant has registered the domain name using the losing registrar (and perhaps even used one or more of the services provided by the losing registrar), the losing registrar may receive a request from a gaining registrar for verification that the domain name registered to the registrant is available for transfer. The losing registrar may use a local database to determine whether the domain name is registered to the registrant and whether the domain name is available for transfer. The losing registrar is hereby defined to be a different registrar than the gaining registrar.

If the domain name is registered to the registrant and the domain name is available for transfer, the losing registrar may transmit a confirmation to the gaining registrar that the domain name registered to the registrant is available for transfer. On the other hand if the domain name is not registered to the registrant or is not available to be transferred, the losing registrar may transmit a denial to the gaining registrar indicating that either the domain name is not registered to the registrant and/or the domain name is not available for transfer.

If the domain name is registered to the registrant and the domain name is available for transfer, the losing registrar may receive a request from the gaining registrar for the contact information for the registrant.

The losing registrar may read from the database the contact information of the registrant and transmit the contact information for the registrant to the gaining registrar. The contact information may be used by the gaining registrar to authenticate the registrant at the gaining registrar who is requesting the transfer of the domain name.

The losing registrar may receive a request for a transfer hold on the domain name registered to the registrant at the losing registrar. Triggered by the losing registrar receiving the request for the transfer hold on the domain name, the losing registrar may store a lock on the domain name registered to the registrant in the database. The lock on the domain name may be configured to prevent the domain name from being transferred to any registrar other than the gaining registrar as part of this method.

The losing registrar may receive a record from the gaining registrar. The record may verify that the registrant has been authenticated by the gaining registrar through the use of the contact information for the registrant supplied by the losing registrar.

The losing registrar may store the record from the gaining registrar in the database verifying that the registrant has been authenticated by the gaining registrar through the use of the contact information for the registrant supplied by the losing registrar.

The losing registrar may receive a request from a registry for an acknowledgement of a transfer of the domain name from the losing registrar to the gaining registrar. The losing registrar may transmit to the registry the acknowledgement of the transfer of the domain name from the losing registrar to the gaining registrar.

It should be appreciated that the claimed invention allows the registrant to transfer the domain name, after the registrant has registered the domain name at the losing registrar, from the losing registrar to the gaining registrar entirely from the gaining registrar's website or application. In other words, the registrant, after registering the domain name at the losing registrar, does not need to visit a website or an application of the losing registrar to initiate or have the domain name transferred from the losing registrar to the gaining registrar. The claimed one location domain name transfer process greatly simplifies the transfer process of the domain name. Of course, the registrant may visit the website or application of the losing registrar as desired by the registrant. The registrant may also have to visit the website or application of the losing registrar if any problems arise, such as the domain name being locked from transfers or the registrant owing fees to the losing registrar. However, in many cases, the claimed invention allows the registrant to transfer their domain name(s) from the losing registrar to the gaining registrar entirely from the website or application of the gaining registrar.

The above features and advantages of the present invention will be better understood from the following detailed description taken in conjunction with the accompanying drawings.

DETAILED DESCRIPTION

Figure 1:
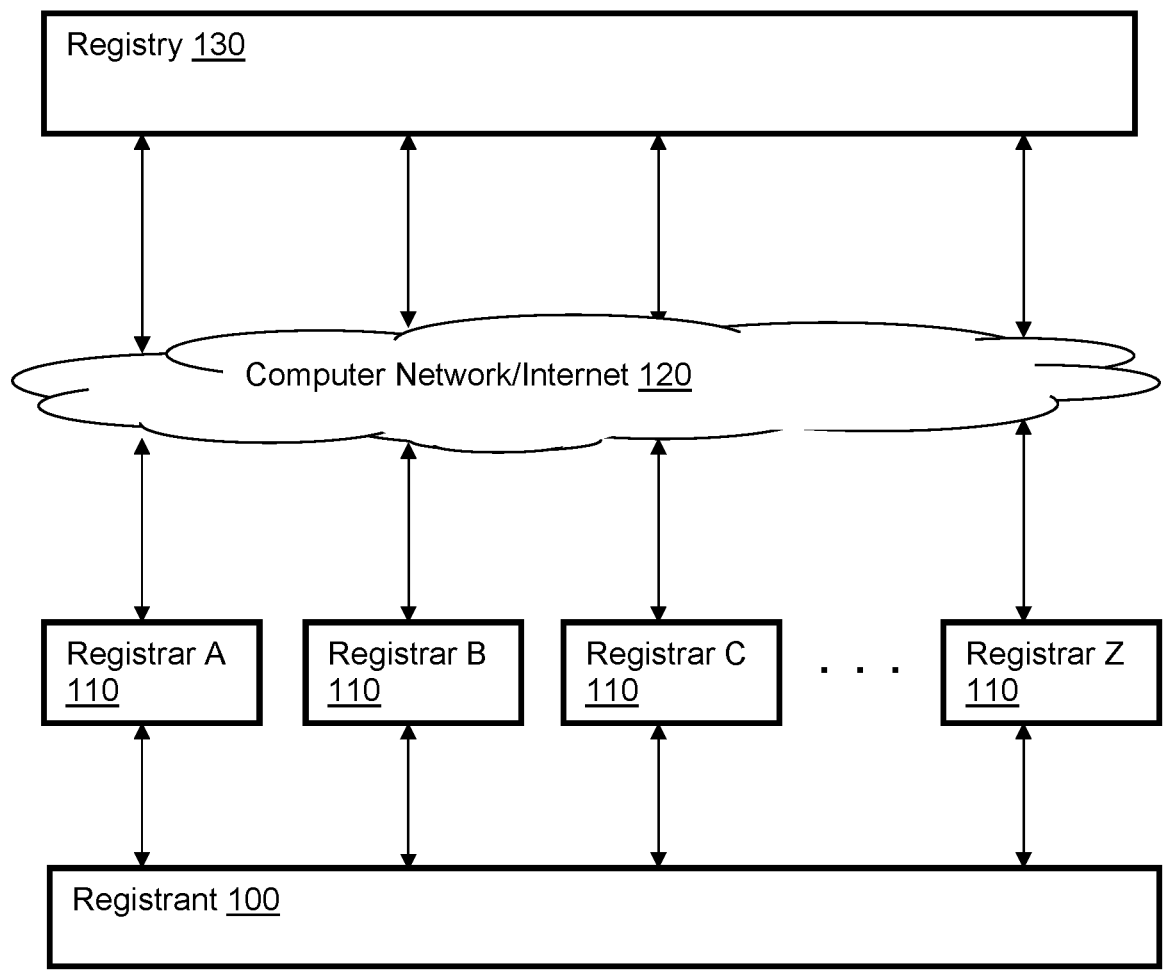
FIG. 1 is a block diagram of a simplified system that may be used to practice the invention comprising a registry, a computer network/Internet, a plurality of registrars and a registrant.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Figure 2:
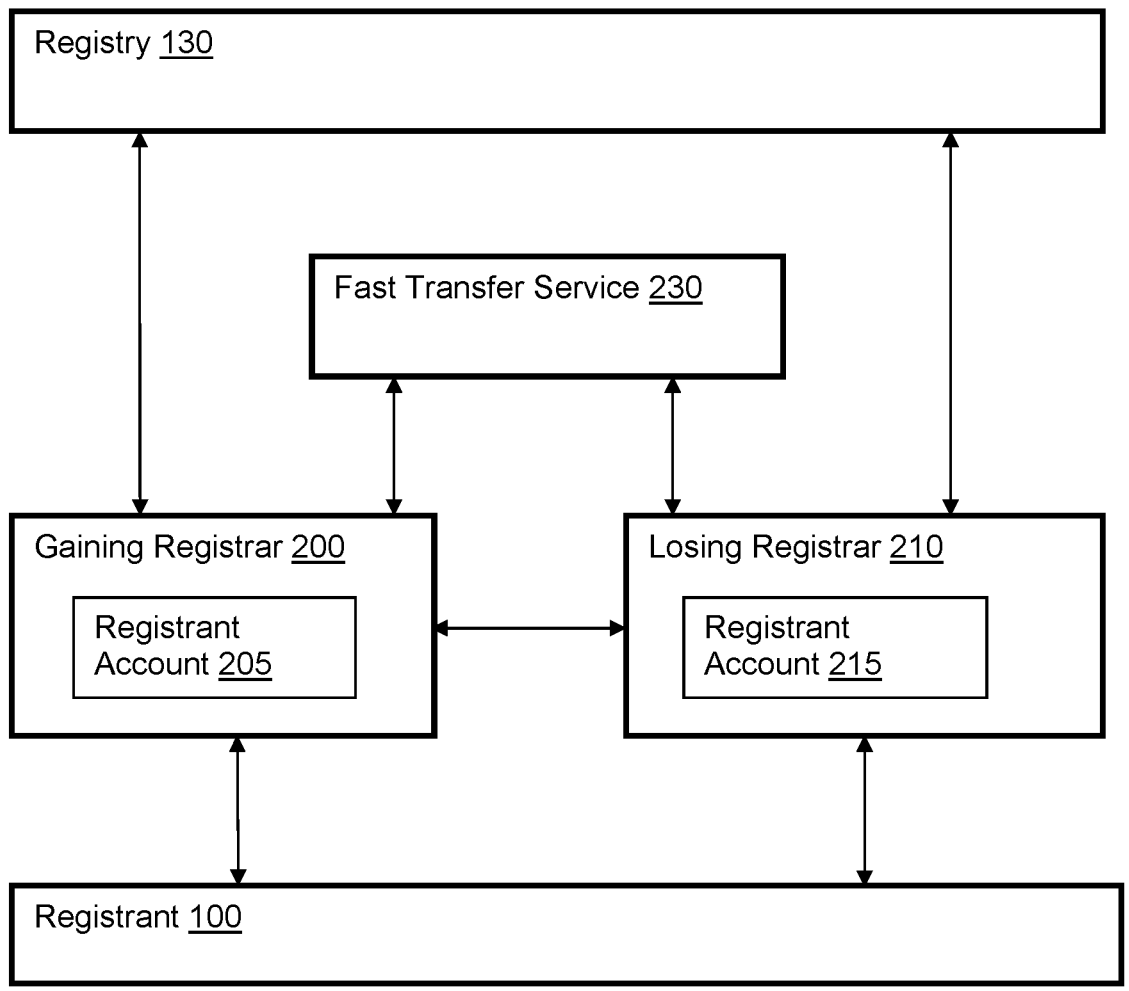
FIG. 2 is a block diagram of a simplified system that may be used to practice the invention comprising a registry, a fast transfer service, a gaining registrar, a losing registrar and a registrant. The arrows indicate computer networks, such as the Internet, that may be used for communication between the various parts of the system.
Figure 3:
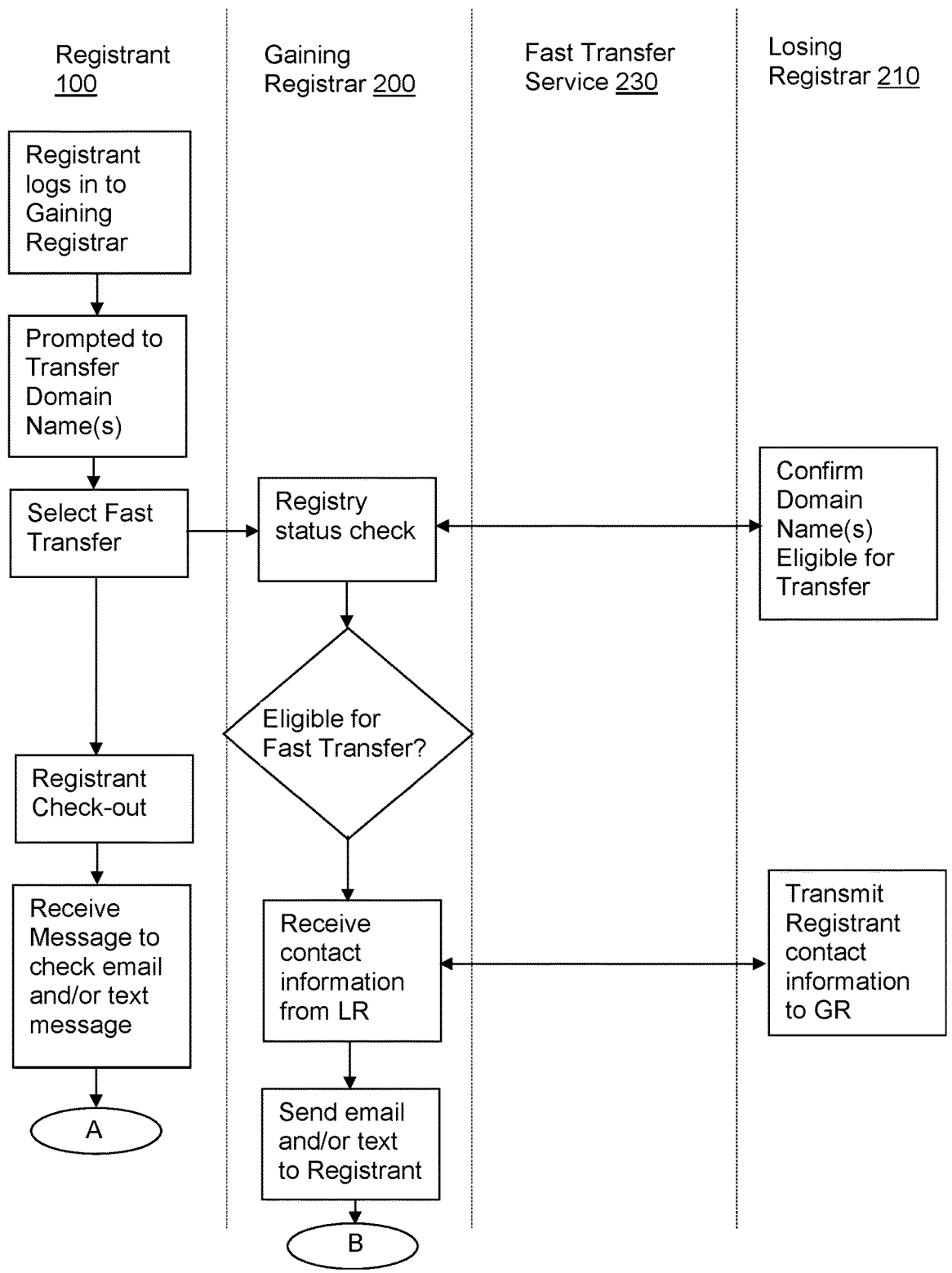
FIGS. 3 and 4 are a work-flow diagram illustrating a relationship, such as the ordering and timing, of various steps of the claimed invention performed by a registrant, a gaining registrar, a fast transfer service and a losing registrar.
Figure 4:
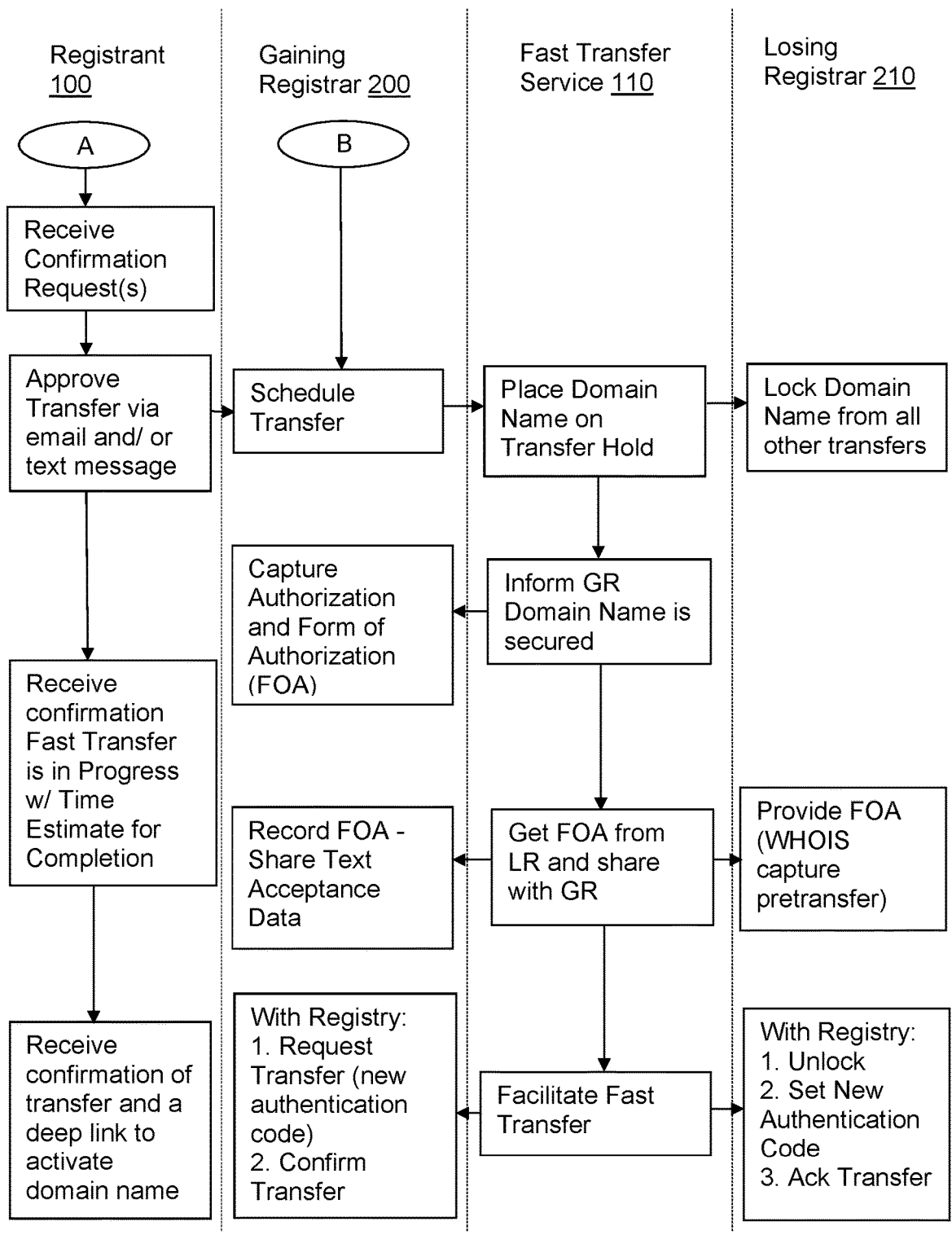
Figure 5:
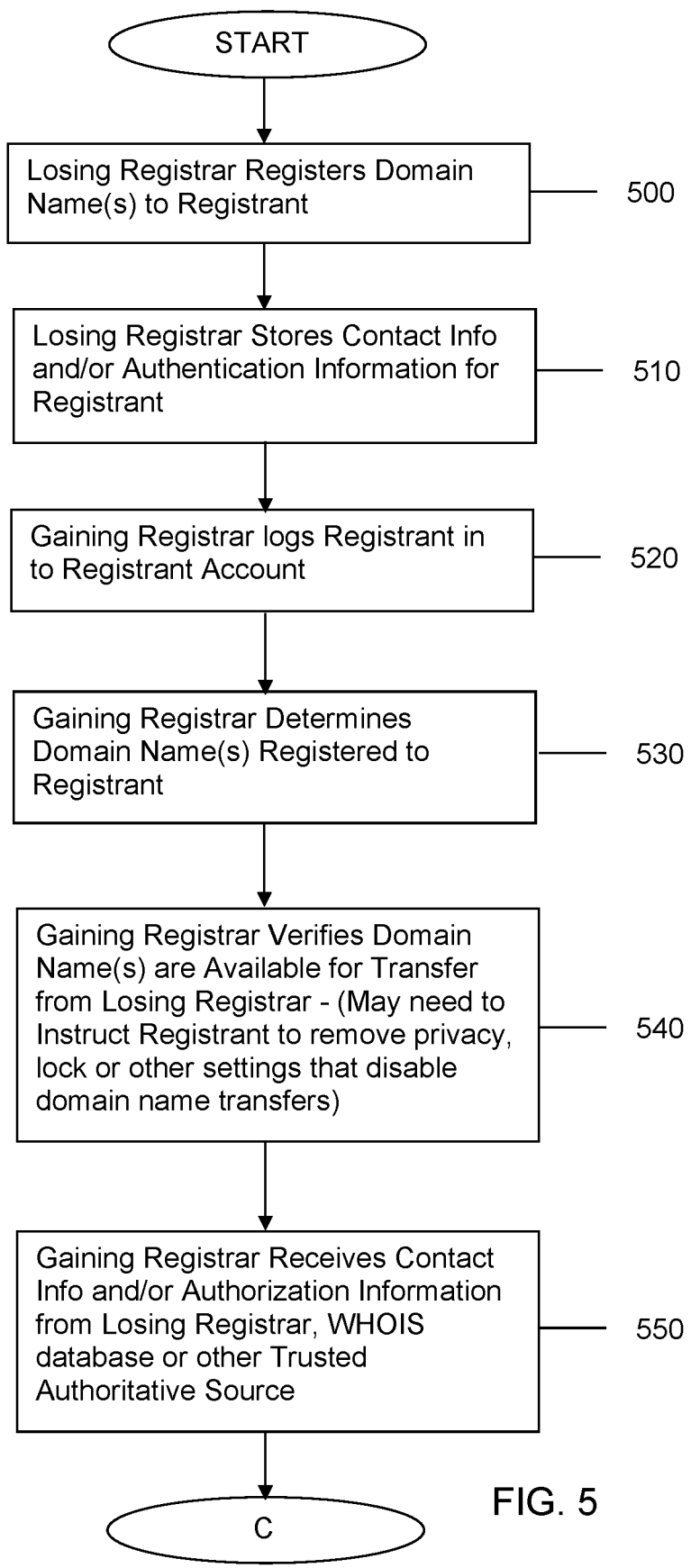
FIGS. 5-8 are a flowchart of steps that may be performed in various embodiments of the claimed invention.
Figure 6:
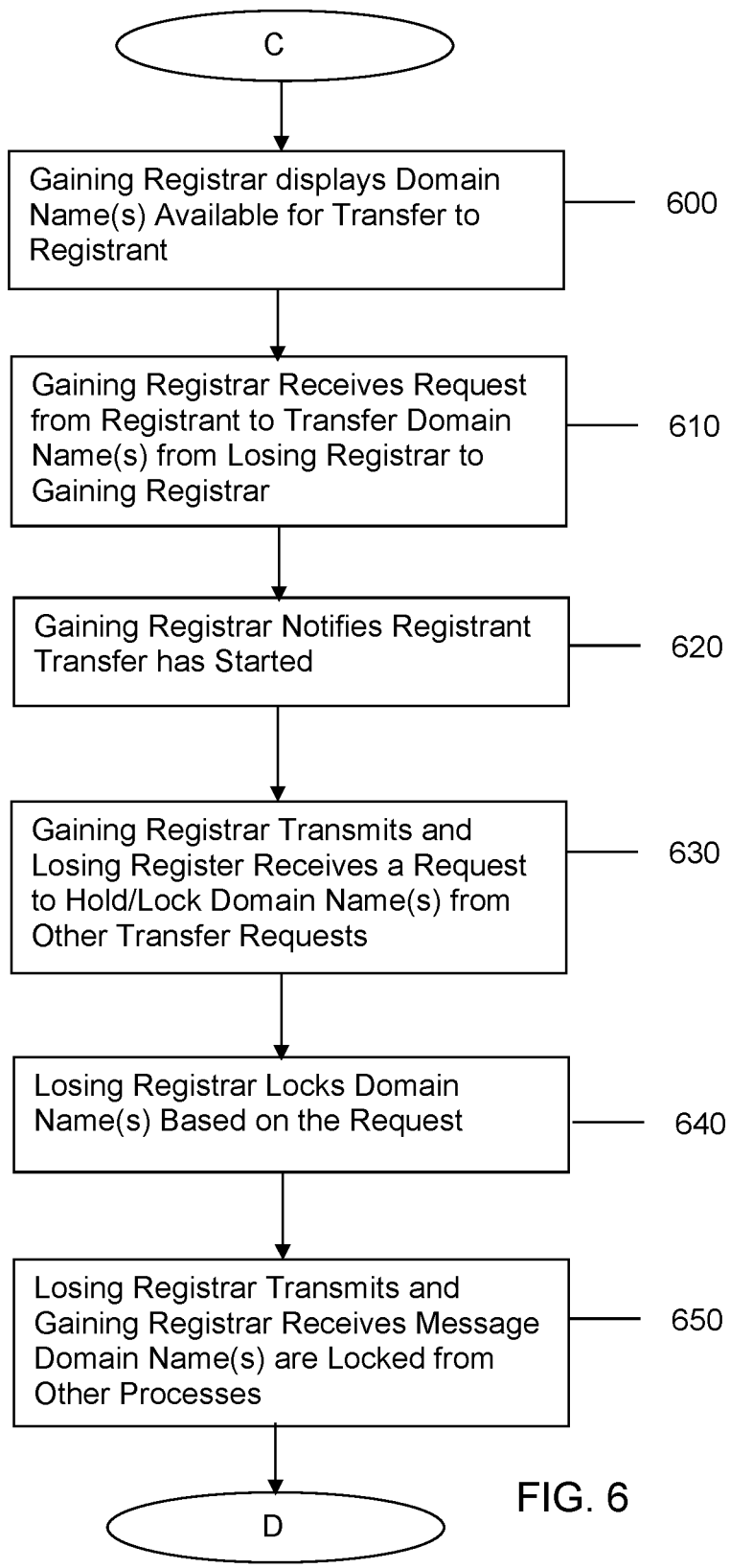
Figure 7:
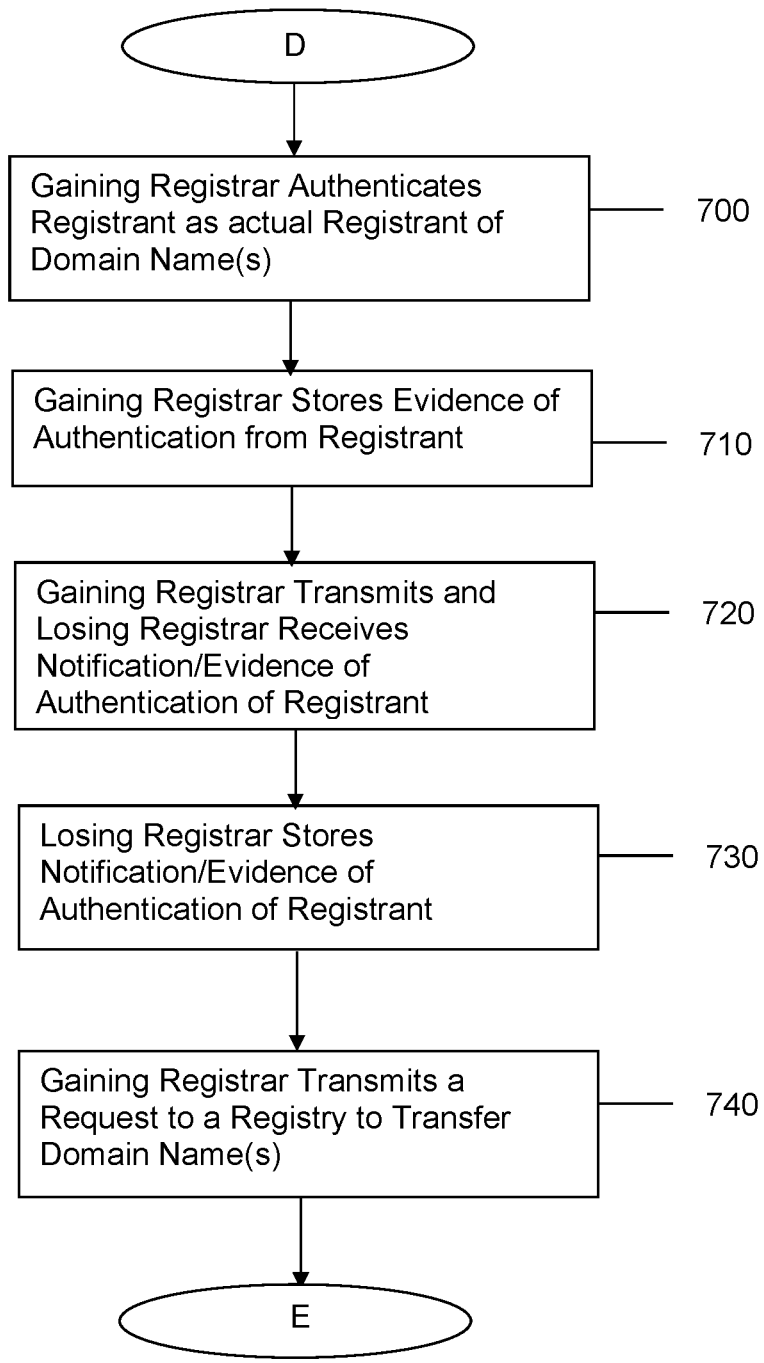
Figure 8:
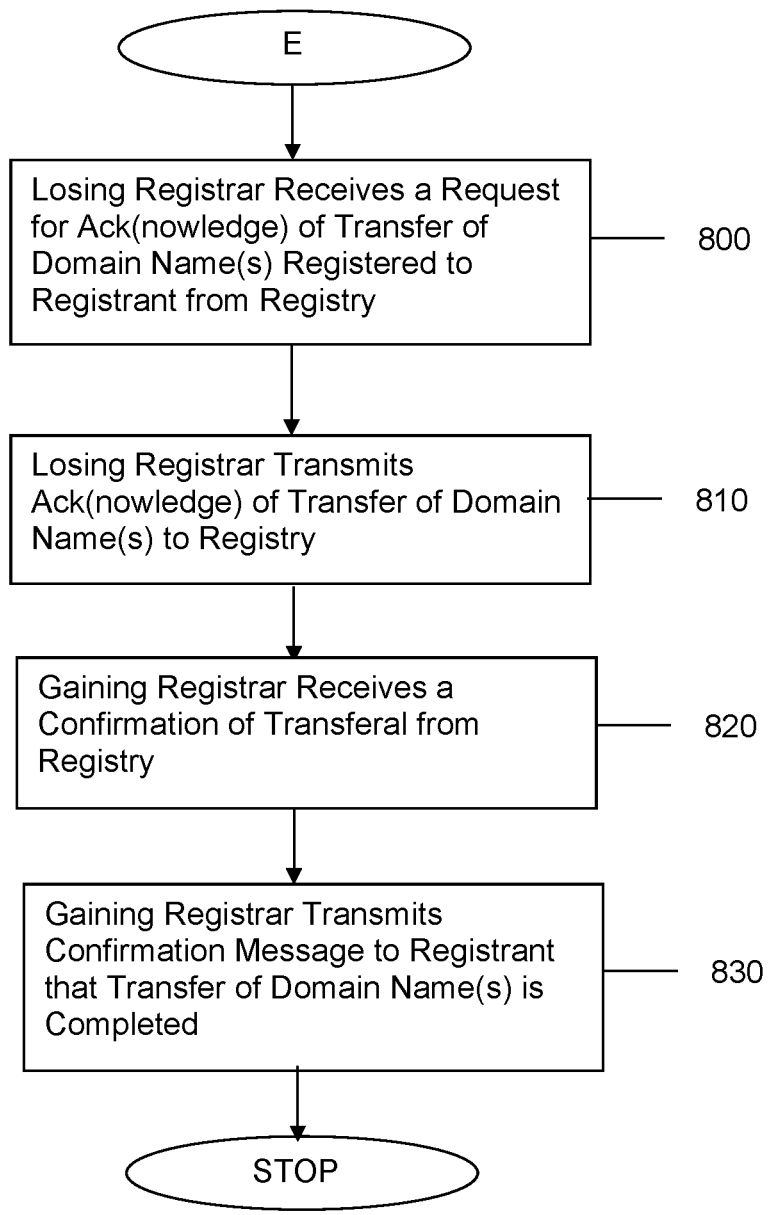

FIGS. 1 and 2 illustrate a simplified system for practicing the invention which may include a registry 130, a computer network/Internet 120, a plurality of registrars 110 (a gaining registrar 200 and a losing registrar 210), a registrant 100 and a fast transfer service 230. The arrows between these parts of the system represent one or more computer networks, such as the Internet 120. The communications may use any currently known or developed in the future methods or protocols. As a non-limiting examples, the parts in the system may communicate with one another using one or more Application Program Interfaces (APIs) or Extensible Provisioning Protocol (EPP).

A computer network is a collection of links and nodes (e.g., multiple computers and/or other devices connected together) arranged so that information may be passed from one part of the computer network to another over multiple links and through various nodes. Non-limiting examples of computer networks include the Internet 120, the public switched telephone network, the global Telex network, computer networks (e.g., an intranet, an extranet, a local-area network, or a wide-area network), wired networks, and wireless networks.

The Internet 120 is a worldwide network of computers and computer networks arranged to allow the easy and robust exchange of information between computer users on clients and websites hosted on servers. Hundreds of millions of people around the world have access to computers connected to the Internet 120 via Internet Service Providers (ISPs). Content providers place multimedia information (e.g., text, graphics, audio, video, animation, and other forms of data) at specific locations on the Internet 120 referred to as websites. The combination of all the websites and their corresponding web pages on the Internet 120 is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related webpages. Websites, unless very large and complex or have unusual traffic demands, typically reside on a single server and are prepared and maintained by a single individual or entity (although websites residing on multiple servers are also becoming increasingly common). Menus, links, tabs, etc. may be used to move between different web pages within the website or to move to a different website.

Websites may be created using HyperText Markup Language (HTML) to generate a standard set of tags that define how the webpages for the website are to be displayed. Users of the Internet 120 may access content providers' websites using software known as an Internet browser, such as MICROSOFT INTERNET EXPLORER™, GOOGLE CHROME™ or MOZILLA FIREFOX™. After the browser has located the desired webpage, the browser requests and receives information from the webpage, typically in the form of an HTML document, and then displays the webpage content for the user on the user's client. The user then may view other webpages at the same website or move to an entirely different website using the browser.

The Internet 120 user may use a client, such as, as non-limiting examples, a cell phone, PDA, tablet, laptop computer, or desktop computer to access a website via a computer network, such as the Internet 120.

The website may have a plurality of webpages and be hosted or operated from one or more servers. The servers may be, as a non-limiting example, one or more Dell PowerEdge(s) rack server(s)™, HP Blade Servers™, IBM Rack or Tower™ servers, although other types of servers, combinations of one or more servers, server software and applications may also be used.

Browsers are able to locate specific websites because each website, resource, and computer on the Internet 120 has a unique Internet Protocol (IP) address. Presently, there are two standards for IP addresses. The older IP address standard, IP Version 4 (IPv4), is a 32-bit binary number, which is typically shown in dotted decimal notation, where four 8-bit bytes are separated by a dot from each other (e.g., 64.202.167.32). The newer IP address standard, IP Version 6 (IPv6), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A uniform resource locator (URL) is much easier to remember and may be used to point to any computer, directory, or file on the Internet 120. A browser is able to access a website on the Internet 120 through the use of a URL. The URL may include a hypertext transfer protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some generic top-level domains (gTLD) and delegates the responsibility to a particular organization (a "registry 130") for maintaining an authoritative source for the registered domain names within a top-level domain (TLD) and their corresponding IP addresses. For certain TLDs (e.g., .biz, .info, .name, and .org) the registry 130 is also the authoritative source for contact information related to the domain name and is referred to as a "thick" registry 130. For other TLDs (e.g., .com and .net) only the domain name, registrar identification, and name server information is stored within the registry 130, and a registrar may be the authoritative source for the contact information related to the domain name. Such registries are referred to as "thin" registries. Most gTLDs are organized through a central domain name Shared Registration System (SRS) based on their TLD. TLDs may also be referred to as domain name extensions.

The process for registering a domain name allows a domain name registrant 100, i.e., registrant 100, to use an ICANN-accredited registrar to register their domain name. For example, if a registrant 100, John Doe, wishes to register the domain name "mycompany.com," John Doe may initially determine whether the desired domain name is available by contacting a domain name registrar, i.e., registrar. The registrant 100 may make this contact using the registrar's webpage and typing the desired domain name into a field on the registrar's webpage created for this purpose. Upon receiving the request from the registrant 100, the registrar may ascertain whether "mycompany.com" has already been registered by checking the SRS database, a zone file containing already registered domain names of a particular TLD or a registry 130 for the TLD of the desired domain name. The results of the search may then be displayed on the webpage to the registrant 100 to thereby notify the registrant 100 of the availability of the domain name. If the domain name is available, the registrant 100 may proceed with the registration process. If the domain name is not available for registration, the registrant 100 may keep selecting alternative domain names until an available domain name is found.

Once a domain name is registered by a registrant 100 with a first registrar (the losing registrar 210), the registrant 100 may want to move the domain name to a different registrar (the gaining registrar 200). A losing registrar 210 is a domain name registrar that has a domain name under management that is initially registered to the registrant 100 as previously described. The domain name may be managed by the registrant 100, prior to transferring the domain name the gaining registrar 200, from a registrant 100 controlled account 215 via a website controlled and maintained by the losing registrar 210. The losing registrar 210 will lose the domain name after the domain name is transferred to a registrant 100 controlled account 205 at a gaining registrar 200. The losing registrar 210 is hereby defined to be a particular machine that comprises a domain name registrar, at least one or more hardware servers, electrical communication equipment to interface with one or more computer networks, routing servers to communicate with a plurality of registrants 100 and software to automate the various processes attributed to the losing registrar 210 in this specification. The losing registrar 210 may have a plurality of customers, with the registrant 100 being one of the losing registrar's customers, with each customer having a customer controlled account.

A gaining registrar 200 is a domain name registrar that will gain a domain name under management that has been transferred by the registrant 100 from a registrant controlled account 215 with the losing registrar 210. The gaining registrar 200 controls and maintains a website that allows the registrant 100 to manage the domain name after the domain name has been transferred. The registrant 100 may purchase and/or register other domain names from the gaining registrar's website. The gaining registrar 200 is hereby defined to be a particular machine, that is a different particular machine from the losing registrar 210, that comprises a domain name registrar, at least one or more hardware servers, electrical communication equipment to interface with one or more computer networks, routing servers to communicate with a plurality of registrars and software to automate the various processes attributed to the gaining registrar 200 in this specification. The gaining registrar 200 may have a plurality of customers, with the registrant 100 being one of the gaining registrar's customers, with each customer having a customer controlled account 205.

With reference to FIGS. 2-8, a registrant 100 may log into a registrant account 215 on a losing registrar 210 and register a desired domain name. The domain name is now consider as being under management of the losing registrar 210 and the registrant 100 may use the domain name as desired and as allowed by the losing registrar 210. However, the registrant 100, for any number of different reasons, such as merging domain name portfolios into a single registrar, cheaper registration costs at a gaining registrar 200 or more services offered by the gaining registrar 200, may desire to transfer the domain name to a different registrar, i.e., the gaining registrar 200.

The claimed invention may start by the losing registrar 210 registering one or more domain names to a registrant 100. (Step 500) The losing registrar 210 may store information regarding the registrant 100 (registrant information) in a local database and, in coordination with a registry 130 responsible for a TLD of the domain name(s), register the domain name to the registrant 100. The registrant contact information and registered one or more domain names may also be stored in the WHOIS database by the registry 130 as part of the domain name registration process. As specific examples, the losing registrar 210 may receive and store an email address and a telephone number for the registrant 100 in a local database and/or, with the cooperation of the registry 130, in the WHOIS database. (Step 510)

The losing registrar 210 may manage the registered domain name for the registrant 100 to perform such actions as, as non-limiting examples, pointing the domain name to a website using a domain name system (DNS) computer network, using the domain name as part of an email address, purchasing a secure socket layer (SSL) certificate that allows encrypted communications across the Internet 120 for the website pointed to by the domain name and/or enabling a privacy service that replaces the contact information of the registrant 100 with the contact information of a proxy in all publicly available databases, such as the WHOIS database. The registrant 100 may also change those services with the losing registrar 210 as desired by the registrant 100 and permitted by the losing registrar 210. As an example, the registrant 100 may cancel or remove a privacy service from the domain name registered to the registrant 100. Removing the privacy service may even be required before the registrant 100 may transfer the domain name from the losing registrar 210 to a gaining registrar 200.

A gaining registrar 200 may receive login credentials from the registrant 100 and upon authenticating the login credentials from the registrant 100, the gaining registrar 200 may log the registrant 100 into a registrant account 205 of the gaining registrar 200. (Step 520) The login credentials from the registrant 100 may be something the registrant 100 knows, such as a user name and a password, something the registrant 100 has, such as a number for a dongle provided by or associated with the gaining registrar 200 or something the registrant 100 is, such as a face, fingerprint, voice sample or retinal pattern that may be verified by the gaining registrar 200.

The gaining registrar 200 may determine one or more domain names registered to the registrant 100 at the losing registrar 210, where the gaining registrar 200 is a different registrar than the losing registrar 210. (Step 530) The gaining registrar 200 may determine the one or more domain names registered to the registrant 100 by receiving this information from the losing registrar 210 upon request from the gaining registrar 200 or by the gaining registrar 200 matching the contact information of the registrant 100 with the contact information in the WHOIS database.

All of the communications described herein between the gaining registrar 200, the losing registrar 210 and the registry 130 may be by any desired method, such as through the use of an application program interface (API) or any other computer network communication protocol. The contact information may be, as non-limiting examples, one or more telephone numbers, one or more email addresses or one or more names of contacts.

The gaining registrar 200 preferably verifies that the domain name is registered to the registrant 100 at the losing registrar 210 and the domain name is available for transfer from the losing registrar 210 to the gaining registrar 200. (Step 540) To accomplish this, the gaining registrar 200 may transmit a request to the losing registrar 210 for a verification that the domain name is registered to the registrant 100 and that the domain name is available for registration.

The losing registrar 210 may receive the request from the gaining registrar 200 for verification that the domain name is registered to the registrant 100 and the domain name is available for transfer. The domain name might not be available for transfer, as non-limiting examples, if the domain name is no longer registered to the registrant 100, the losing registrar 210 is not the current registrar that has management control over the domain name, the registrant 100 has requested at the losing registrar 210 that the domain name not be available for transfer (perhaps to block fraudulent transfers), and/or the domain name has a privacy service which may need to be disabled prior to transferring the domain name.

If the domain name is registered to the registrant 100 and the domain name is available for transfer, the losing registrar 210 may transmit a confirmation to the gaining registrar 200 that the domain name is registered to the registrant 100 and is available for transfer. If the domain name is not registered to the registrant 100 and/or is not available for transfer, the losing registrar 210 may transmit a rejection or a denial to the gaining registrar 200 letting the gaining registrar 200 know that the domain name is not registered to the registrant 100 and/or the domain name is not available for transfer. The gaining registrar 200 may terminate the process and notify the registrant 100 that the losing registrar 210 has prevented the transfer and, preferably, the problem the losing registrar 210 has with the transfer, i.e., funds owed to the losing registrar 210 by the registrant 100, domain name not registered with the losing registrar 210 and/or a hold or lock is in place on the domain name preventing the domain name from being transferred.

The gaining registrar 200 may read information from a public database, such as the WHOIS database, to determine contact information for the registrant 100 of the domain name.

In another embodiment, the gaining registrar 200 may transmit a request to the losing registrar 210 for contact information of the registrant 100 of the domain name. The requested contact information may be, as non-limiting examples, a telephone number and/or an email address of the registrant 100 (or an authorized agent of the registrant 100). The losing registrar 210 may receive the request from the gaining registrar 200 for the contact information, e.g., email address and the telephone number for the registrant 100. The losing registrar 210 may read the contact information from a local database or from the WHOIS database and transmit the contact information to the gaining registrar 200. (Step 550)

The gaining registrar 200 may display on a client device of the registrant 100 the domain name that is registered to the registrant 100 at the losing registrar 210 and is available for transfer from the losing registrar 210 to the gaining registrar 200. The display may comprise a webpage on a website of the gaining registrar 200, preferably only viewable from a registrant account 205 with the gaining registrar 200. In other embodiments, the display may be part of an application running on the client device that is receiving information from webservers operated by the gaining registrar 200. (Step 600)

The gaining registrar 200 may receive from the client device of the registrant 100 a request to transfer the domain name from the losing registrar 210 to the registrant account 205 of the gaining registrar 200. (Step 610)

The gaining registrar 200 may display a message on the client device that the transfer is in progress. (Step 620) The gaining registrar 200 may transmit a transfer hold to the losing registrar 210 for the domain name and the losing registrar 210 may receive the transfer hold for the domain name registered to the registrant 100. (Step 630)

Triggered by receiving by the losing registrar 210 the request for the transfer hold on the domain name, the losing registrar 210 may store a hold on the domain name registered to the registrant 100 in the database. The hold on the domain name may be configured to prevent the domain name from being transferred to any registrar other than the gaining registrar 200 acting as part of this method. (Step 640) Thus, the losing registrar 210 may hold the domain name or otherwise prevent the domain name from being transferred by any other processes and/or by any other registrars. The losing registrar 210 may transmit a message to the gaining registrar 200 confirming that the transfer hold has been activated. However, if the transfer hold was not activated, the losing registrar 210 may transmit a message to the gaining registrar 200 that the transfer hold has not been activated. The gaining registrar 200 may receive a confirmation, assuming the transfer hold was activated, that the transfer hold for the domain name is active. (Step 650)

The gaining registrar 200 may transmit confirmation requests by one, two or more methods to obtain authorization from the registrant 100 for the transfer of the domain name from the losing registrar 210 to the gaining registrar 200. As non-limiting examples, an email with a first identification method may be transmitted to the registrant 100 and an SMS message with a second identification method may be transmitted to the registrant 100. As another non-limiting example, first identification method may be a link in an email that when selected authenticates the registrant 100 for the first identification method and the second identification method may be an SMS message to the telephone number that when transmitted to the gaining registrar 200 authenticates the registrant 100 for the second identification method.

Thus, the gaining registrar 200 may receive from the registrant 100 a first response to a first identification method and a second response to a second identification method. The gaining registrar 200 may be configured to terminate the transfer of the domain name if either the first response or the second response is not authenticated. The gaining registrar 200 may also be configured to proceed with the transfer of the domain name only if the first response and the second response are authenticated as being from the registrant 100. (Step 700)

The gaining registrar 200 may store the first response and the second response in a database. (Step 710) The responses may be saved and used later, if needed, to prove that the registrant 100 did approve the transfer of the domain name from the losing registrar 210 to the gaining registrar 200. The gaining registrar 200 may also transmit in a record the confirmations to the losing registrar 210 so that the losing registrar 210 also has evidence that the registrant 100 authorized the domain name to be transferred from the losing registrar 210 to the gaining registrar 200.

The losing registrar 210 may receive and store the record, from the gaining registrar 200, verifying that the registrant 100 has been authenticated by the gaining registrar 200 through the use of contact information. As non-limiting examples, the contact information may be the email address and the telephone number for the registrant 100, preferably supplied to the gaining registrar 200 by the losing registrar 210. (Step 720 and 730)

The gaining registrar 200 may transmit a request to the registry 130 for the transfer of the domain name. The registry 130 may be configured to request an acknowledgement of the transfer by the losing registrar 210 before actually performing the transfer. (Step 740) The registry 130 may transmit a request to the losing registrar 210 to confirm domain name transfer.

The losing registrar 210 may receive the request from the registry 130 for the acknowledgement of the transfer of the domain name from the losing registrar 210 to the gaining registrar 200. (Step 800) The losing registrar 210 may transmit to the registry 130, assuming the losing registrar 210 does approve of the transfer, an acknowledgement of the transfer of the domain name from the losing registrar 210 to the gaining registrar 200. (Step 810)

The gaining registrar 200 may receive a confirmation of the transfer of the domain name from the registry 130, if the registry 130 received the acknowledgement from the losing registrar 210. (Step 820) The gaining registrar 200 may display a message on the client device of the registrant 100 that the transfer for the domain name from the losing registrar 210 to the gaining registrar 200 is complete. (Step 830)

It should be appreciated that communications between the gaining registrar 200 and the losing registrar 210 described herein may be transmitted through a fast transfer service 230. It should also be appreciated that while the invention has generally been described as transferring a single domain name, a plurality of different domain names may also be transferred substantially simultaneously from the losing registrar 210 to the gaining registrar 200 using this method. In addition, it should be noted that the domain name may be transferred from the losing registrar 210 to the gaining registrar 200 after the registrant 100 has registered the domain name at the losing registrar 210, without the registrant 100 needing to again communicate with the losing registrar 210. In other words, the registrant 100, after registering the domain name at the losing registrar 210, may transfer the domain name from the losing registrar 210 to the gaining registrar 200 all from communications with the gaining registrar 200, i.e., the registrant 100 does not need to communicate with the losing registrar 210 after the domain name registration process. This has the advantage of simplifying the process for the registrant 100 as the registrant 100 may initiate the transfer process of the domain name all from just one website or application, i.e., the gaining registrar's website or the gaining registrar's application.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method, comprising steps of:
    registering by a losing registrar a domain name to a registrant;
    receiving and storing by the losing registrar a contact information for the registrant in a database;
    receiving by the losing registrar a request from a gaining registrar for verification that the domain name registered to the registrant is available for transfer, wherein the losing registrar is a different registrar than the gaining registrar;
    transmitting by the losing registrar a confirmation to the gaining registrar that the domain name registered to the registrant is available for transfer;
    receiving by the losing registrar a request from the gaining registrar for the contact information for the registrant;
    reading by the losing registrar from the database the contact information for the registrant;
    transmitting by the losing registrar the contact information for the registrant to the gaining registrar;
    receiving by the losing registrar a request for a transfer hold on the domain name registered to the registrant at the losing registrant;
    triggered by receiving by the losing registrar the request for the transfer hold on the domain name, storing a lock on the domain name registered to the registrant in the database, wherein the lock on the domain name is configured to prevent the domain name from being transferred to any registrar other than the gaining registrar as part of this method;
    receiving by the losing registrar a record from the gaining registrar verifying that the registrant has been authenticated by the gaining registrar through the use of the contact information for the registrant supplied by the losing registrar;
    storing by the losing registrar the record from the gaining registrar in the database verifying that the registrant has been authenticated by the gaining registrar through a use of the contact information for the registrant supplied by the losing registrar;
    receiving by the losing registrar a request from a registry for an acknowledgement of a transfer of the domain name from the losing registrar to the gaining registrar; and
    transmitting by the losing registrar to the registry the acknowledgement of the transfer of the domain name from the losing registrar to the gaining registrar, wherein the registrant, after registering the domain name at the losing registrar, initiates the transfer of the domain name from the losing registrar to the gaining registrar entirely from the gaining registrar and without the registrant directly communicating with the losing registrar.

2. The method of claim 1, further comprising a step of:
    verifying by the losing registrar that the domain name is not locked from transfers, prior to the step of transmitting by the losing registrar the confirmation to the gaining registrar that the domain name registered to the registrant is available for transfer.

3. The method of claim 1, further comprising a step of:
    verifying by the losing registrar that the domain name is not protected by a privacy service that hides the contact information of the registrant, prior to the step of transmitting by the losing registrar the confirmation to the gaining registrar that the domain name registered to the registrant is available for transfer.

4. The method of claim 1, further comprising a step of:
    verifying by the losing registrar that the domain name is not locked from transfers and is not protected by a privacy service that hides the contact information of the registrant, prior to the step of transmitting by the losing registrar the confirmation to the gaining registrar that the domain name registered to the registrant is available for transfer.

5. The method of claim 1, wherein the domain name is one of a plurality of domain names simultaneously transferred from the losing registrar to the gaining registrar using this claimed method.

6. The method of claim 1, wherein the gaining registrar and the losing registrar are two registrars in a plurality of registrars, wherein each registrar in the plurality of registrars is configured to be either a gaining registrar or a losing registrar.

7. The method of claim 1, wherein communications between the gaining registrar and the losing registrar are routed through a fast transfer service.

8. A method, comprising steps of:
    registering by a losing registrar a domain name to a registrant;
    receiving and storing by the losing registrar an email address or a telephone number for the registrant in a database;
    receiving by the losing registrar a request from a gaining registrar for verification that the domain name registered to the registrant is available for transfer, wherein the losing registrar is a different registrar than the gaining registrar;
    receiving by the losing registrar from the registrant a command to remove a transfer lock from the domain name registered to the registrant;
    transmitting by the losing registrar a confirmation to the gaining registrar that the domain name registered to the registrant is available for transfer;
    receiving by the losing registrar a request from the gaining registrar for the email address or a telephone number for the registrant;
    reading by the losing registrar from the database the email address or the telephone number for the registrant;
    transmitting by the losing registrar the email address or the telephone number for the registrant to the gaining registrar;
    receiving by the losing registrar a request for a transfer hold on the domain name registered to the registrant at the losing registrant;
    triggered by receiving by the losing registrar the request for the transfer hold on the domain name, storing a lock on the domain name registered to the registrant in the database, wherein the lock on the domain name is configured to prevent the domain name from being transferred to any registrar other than the gaining registrar as part of this method;
    receiving by the losing registrar a record from the gaining registrar verifying that the registrant has been authenticated by the gaining registrar through the use of the email address or the telephone number for the registrant supplied by the losing registrar;

storing by the losing registrar the record from the gaining registrar in the database verifying that the registrant has been authenticated by the gaining registrar through a use of the email address or the telephone number for the registrant supplied by the losing registrar;

receiving by the losing registrar a request from a registry for an acknowledgement of a transfer of the domain name from the losing registrar to the gaining registrar; and transmitting by the losing registrar to the registry the acknowledgement of the transfer of the domain name from the losing registrar to the gaining registrar.

9. The method of claim 8, further comprising a step of:
verifying by the losing registrar that the domain name is not locked from transfers, prior to the step of transmitting by the losing registrar the confirmation to the gaining registrar that the domain name registered to the registrant is available for transfer.

10. The method of claim 8, further comprising a step of:
verifying by the losing registrar that the domain name is not protected by a privacy service that hides the email address or the telephone number for the registrant, prior to the step of transmitting by the losing registrar the confirmation to the gaining registrar that the domain name registered to the registrant is available for transfer.

11. The method of claim 8, further comprising a step of:
verifying by the losing registrar that the domain name is not locked from transfers and is not protected by a privacy service that hides the email address or the telephone number for the registrant, prior to the step of transmitting by the losing registrar the confirmation to the gaining registrar that the domain name registered to the registrant is available for transfer.

12. The method of claim 8, wherein the domain name is one of a plurality of domain names simultaneously transferred from the losing registrar to the gaining registrar using this claimed method.

13. The method of claim 8, wherein the gaining registrar and the losing registrar are two registrars in a plurality of registrars, wherein each registrar in the plurality of registrars is configured to be either a gaining registrar or a losing registrar.

14. The method of claim 8, wherein communications between the gaining registrar and the losing registrar are routed through a fast transfer service.

15. A method, comprising steps of:
registering by a losing registrar a domain name to a registrant;
receiving and storing by the losing registrar an email address and a telephone number for the registrant in a database;
receiving by the losing registrar from the registrant a command to remove a privacy service from the domain name registered to the registrant;
receiving by the losing registrar a request from a gaining registrar for verification that the domain name registered to the registrant is available for transfer, wherein the losing registrar is a different registrar than the gaining registrar;

transmitting by the losing registrar a confirmation to the gaining registrar that the domain name registered to the registrant is available for transfer;

receiving by the losing registrar a request from the gaining registrar for the email address and the telephone number for the registrant;

reading by the losing registrar from the database the email address and the telephone number for the registrant;

transmitting by the losing registrar the email address and the telephone number for the registrant to the gaining registrar;

receiving by the losing registrar a request for a transfer hold on the domain name registered to the registrant at the losing registrant;

triggered by receiving by the losing registrar the request for the transfer hold on the domain name, storing a lock on the domain name registered to the registrant in the database, wherein the lock on the domain name is configured to prevent the domain name from being transferred to any registrar other than the gaining registrar as part of this method;

receiving by the losing registrar a record from the gaining registrar verifying that the registrant has been authenticated by the gaining registrar through the use of the email address and the telephone number for the registrant supplied by the losing registrar;

storing by the losing registrar the record from the gaining registrar in the database verifying that the registrant has been authenticated by the gaining registrar through a use of the email address and the telephone number for the registrant supplied by the losing registrar;

receiving by the losing registrar a request from a registry for an acknowledgement of a transfer of the domain name from the losing registrar to the gaining registrar; and transmitting by the losing registrar to the registry the acknowledgement of the transfer of the domain name from the losing registrar to the gaining registrar.

16. The method of claim 15, further comprising a step of:
verifying by the losing registrar that the domain name is not locked from transfers and is not protected by a privacy service that hides the email address and the telephone number for the registrant, prior to the step of transmitting by the losing registrar the confirmation to the gaining registrar that the domain name registered to the registrant is available for transfer.

17. The method of claim 15, wherein the domain name is one of a plurality of domain names simultaneously transferred from the losing registrar to the gaining registrar using this claimed method.

18. The method of claim 15, wherein the gaining registrar and the losing registrar are two registrars in a plurality of registrars, wherein each registrar in the plurality of registrars is configured to be either a gaining registrar or a losing registrar.

19. The method of claim 15, wherein communications between the gaining registrar and the losing registrar are routed through a fast transfer service.

* * * * *